US008944233B2

(12) United States Patent
Cui

(10) Patent No.: US 8,944,233 B2
(45) Date of Patent: Feb. 3, 2015

(54) VERTICAL CONVEYING CHANNEL AND USES THEREOF

(76) Inventor: Xuesong Cui, Vancouver (CA)

( * ) Notice: Subject to any disclaimer, the term of this patent is extended or adjusted under 35 U.S.C. 154(b) by 83 days.

(21) Appl. No.: 13/510,497

(22) PCT Filed: Nov. 18, 2010

(86) PCT No.: PCT/CN2010/078876
§ 371 (c)(1), (2), (4) Date: May 17, 2012

(87) PCT Pub. No.: WO2011/060726
PCT Pub. Date: May 26, 2011

(65) Prior Publication Data

US 2012/0228082 A1 Sep. 13, 2012

(30) Foreign Application Priority Data

Nov. 20, 2009 (CN) .......................... 2009 1 0310061

(51) Int. Cl.
*B65G 11/10* (2006.01)
*D03D 15/08* (2006.01)
(Continued)

(52) U.S. Cl.
CPC *D03D 15/08* (2013.01); *D04B 1/18* (2013.01); *A62B 1/20* (2013.01); *D10B 2401/063* (2013.01); *D10B 2401/13* (2013.01); *D10B 2505/12* (2013.01)
USPC ....................... 193/25 S; 193/25 R; 193/25 C

(58) Field of Classification Search
USPC ................... 193/25 R, 25 S, 25 C; 244/137.2
See application file for complete search history.

(56) References Cited

U.S. PATENT DOCUMENTS 3,973,644 A * 8/1976 Zephinie ......................... 182/47
4,005,762 A * 2/1977 Zephinie ......................... 182/48
(Continued)

FOREIGN PATENT DOCUMENTS

CN 2031695 U 2/1989
CN 2210007 Y 10/1995
(Continued)

OTHER PUBLICATIONS

International Search Report (PCT/ISA/210) issued on Feb. 24, 2011, by the Chinese Intellectual Property Office as the International Searching Authority for International Application No. PCT/CN2010/078876.
(Continued)

*Primary Examiner* — Leslie A Nicholson, III
*Assistant Examiner* — Keith R Campbell
(74) *Attorney, Agent, or Firm* — Buchanan Ingersoll & Rooney PC

(57) ABSTRACT

A vertical conveying channel is made of elastic fabric. The elastic fabric's latitude elastic deformation rate is 100~450%, latitude resilience is 300~2500N, and latitude elastic recovery rate is 70~100%; preferably, the latitude elastic deformation rate is 120~400%, the latitude resilience is 350~2300N, and the latitude elastic recovery rate is 75~98%; more preferably, the latitude elastic deformation rate is 140~350%, the latitude resilience is 550~2200N, and the latitude elastic recovery rate is 80~96%; most preferably, the latitude elastic deformation rate is 170~300%, the latitude resilience is 750~2000N, and the latitude elastic recovery rate is 85~94%. The vertical conveying channel can be used for vertical conveying of cargo or personnel, preferably used in the field of lifesaving, engineering or military.

14 Claims, 2 Drawing Sheets

(51) Int. Cl.

*D04B 1/18* (2006.01)
*A62B 1/20* (2006.01)

(56) References Cited

U.S. PATENT DOCUMENTS

| | | | | | |
|---|---|---|---|---|---|
| 5,871,066 | A | * | 2/1999 | Reece | 182/48 |
| 6,098,747 | A | * | 8/2000 | Reece | 182/48 |
| 6,598,703 | B1 | * | 7/2003 | Catalan | 182/48 |
| 7,159,823 | B1 | * | 1/2007 | Paustian et al. | 244/137.1 |
| 2005/0029044 | A1 | * | 2/2005 | Latimer et al. | 182/78 |

FOREIGN PATENT DOCUMENTS

| | | | |
|---|---|---|---|
| CN | 1431026 | A | 7/2003 |
| CN | 1431345 | A | 7/2003 |
| CN | 1442213 | A | 9/2003 |
| CN | 1189226 | C | 2/2005 |
| CN | 15799578 | A | 2/2005 |
| CN | 1853742 | A | 11/2006 |
| CN | 101115874 | A | 1/2008 |
| CN | 101318059 | A | 12/2008 |
| SU | 1248607 | A1 | 8/1986 |
| WO | WO 92/03189 | A1 | 3/1992 |

OTHER PUBLICATIONS

Qing Shao et al. "Research Headway of Antibacterial Paint" Materials Review, vol. 22, No. 3, Mar. 2008.

* cited by examiner

VERTICAL CONVEYING CHANNEL AND USES THEREOF

FIELD OF THE INVENTION

The present invention relates to fields of high-altitude life-saving, engineering, the military and others. Specifically, it relates to a vertical conveying channel and using thereof.

BACKGROUND OF THE INVENTION

At present, helicopters are usually required to convey personnel in distress or military personnel vertically with a lifeline or parachutes in some emergency cases such as that in the fields of life-saving, engineering, and military, etc.

China patent CN03138884 disclosed a method and a channel for fire rescue, using a security rope for evacuation from high buildings. A rescue channel with a wheel coiled with rope and a lever is pre-set on the outer surface of a building. When emergency occurs in the building, people can pull out the safety hook on the free end of the security rope and fix it on the lifebelt on their own bodies, then fall down along the outer surface of the building.

China patent CN03113141 discloses another type of escape means comprising a fixed axis, a lifeline, a speed controlling channel, and a life-saving bag. Both the upper end of the lifeline and the life-saving bag are fixed to an axis, and the lifeline is set in the life-saving bag. The speed controlling channel is set around the lifeline, which comprises fixing sleeves, fixing pulleys, strength springs, speed controlling handles, and sealing devices. A strengthening rope is set in the life-saving bag. Each section of the life-saving bag is sewn with elastic bands for shrinking the life-saving bags. The junction of two sections of the life-saving bag is set with metal connecting rings or connecting buckles. The lower part of the speed controlling device is set with safety belt which is set with a flexible safety seat.

However, the using methods of the above channels are complex, and need high proficiency of using. When encountering a sudden emergency, people's thought and behavior are so flustered that it difficult for them to use these complex channels for escape. Therefore, a more simple and reliable emergency escape device is desirably required.

In addition, China patent CN88205652 discloses a landing bag for fire life-saving. The landing bag is a long fabric bag, being distributed with a number of flexible rubber hoses or belts as a tight ferrule. When an emergency occurs suddenly, people descend through the landing bag with heads upward, and control the falling speed by hands and feet pressing on the inner surface of said landing bag. Usually, stronger force is needed for people to control the speed by pressing on the inner surface of said landing bag with hands and feet. So it's too difficult for the weak to do, especially difficult for the elderly and children. Furthermore, fat person cannot pass through the landing bag successfully because little flexibility of the rubber hoses makes the opening of the tight ferrule too narrow to pass through. Hence, the application scope of this landing bag is limited.

In view of these, the present invention is proposed expressly.

SUMMARY OF THE INVENTION

A purpose of the present invention is to provide a vertical conveying channel, wherein the vertical conveying channel has low cost, wide application scope, and is easy and reliable to use.

Another purpose of the present invention is to provide using of the vertical conveying channel which is applied to deliver supplies or personnel in many fields.

In order to achieve the purposes of the present invention, the following technical schemes are taken out:

A vertical conveying channel, wherein the vertical conveying channel has a inner space and longitudinally extend with at least one end opened, preferably both two ends opened, inner surface of the channel is elastic, and the inner diameter of the channel is less than the one of objects transported, the objects are pressed by contracting of the inner surface of the channel during being used, to slow down the falling speed of the objects.

An outer surface of the conveying channel can be made of any materials, such as metal, rubber, fabric, etc. But in order to make the conveying channel be folded into a smaller volume for conveniently carrying when not in use, a soft material would be preferable. More preferably, the same one, the inner surface of the conveying channel made of, would be chosen. When the outer surface of the conveying channel is made of hard materials such as metal, or made of inelastic materials such as hard plastic, it is necessary to set up enough space between the inner and the outer surface to avoid a stoppage of the transported objects, i.e. the diameter of the outer surface must be greater than the one of the transported objects'. Thus, as for the specific diameter of the outer surface, it is based on its application. Generally, it only needs to measure the size of the transported objects to ensure the diameter of the outer surface of said conveying channel without paying any creative work by the person skilled in the art.

The inner surface can be made of any kinds of elastic material, such as soft elastic rubber, any natural or man-made fiber fabric, etc., preferably made of elastic fabric. The elastic fabric has a latitudinal elastic deformation rate of 100% to 450%, a latitudinal resilience of 300N to 2500N, a latitudinal elastic recovery rate of 70% to 100%; preferably has the latitudinal elastic deformation rate of 120% to 400%, the latitudinal resilience of 350N to 2300N, and the latitudinal elastic recovery rate of 75% to 98%; more preferably has the latitudinal elastic deformation rate of 140% to 350%, the latitudinal resilience of 550N to 2200N, and the latitudinal elastic recovery rate of 80% to 96%; most preferably has the latitudinal elastic deformation rate of 170% to 300%, the latitudinal resilience of 750N to 2000N, and the latitudinal elastic recovery rate of 85% to 94%, the latitudinal resilience is on the condition of latitudinal elongation at break of 80%.

The latitudinal direction is a horizontal direction when the conveying channel is placed vertically, and longitudinal direction is perpendicular to the ground.

The vertical conveying channel of the present invention is made of special elastic fiber-based material with excellent flexibility, for which the descent speed of human bodies or goods can be significantly reduced so that landing safety is insured. The application principle of the conveying channel is, that the circumference of the channel made of elastic fabric denoted by $\oint 1$ and the circumference of descent denoted by $\oint 2$ with a falling body (human body or goods) in the channel are deformed to generate tighten force (resilience), the tighten force (resilience) can slow down the rate of the descent, to realize the purpose of safety landing. So, the following factors about the preparation of the elastic material need to be completely considered for the landing safety of the descent: great enough tighten force (resilience) generated by the change of $\oint 2$ and $\oint 1$, proper deformation of $\oint 2$ and $\oint 1$, and enough times of recoverable deformation of $\oint 2$ and $\oint 1$.

Confirmed in lots of repeated experiments, the vertical conveying channel can realize to convey vertically people or goods safely from an elevated point to the ground when the fabric satisfies the conditions said above, i.e. a certain elastic deformation, a certain fabric elastic recovery rate and a certain range of tighten force (resilience).

Elastic recovery rate: an electronic universal testing machine is used to test the stretching performance and resilient elasticity of the fabric with sample wide of 50 mm, spacing of 100 mm to 200 mm and drawing speed of 100 mm/min. In experiments of the fixed stretch length and repeated stretching, X % is defined as the rate of specified elongation, pause 30 s on status of fixed stretching and 30 s after reset, and use Y to signify times of repeated cycles of stretching. Then the elastic recovery rate is calculated as follows:

$$\text{Elastic recovery rate (\%)} = \frac{L_1 - L_1'}{L_1 - L_0} \times 100$$

wherein:

$L_0$—sample's original length;

$L_1$—the sample's length on fixed stretching;

$L_1'$—the sample's reset length.

Fabric tightening force (resilience): in order to signify the effect of the elastic pressure exerted by the recovery load of the tighten fabric in certain elongation upon the descent, we quote this concept: tightening force (resilience), i.e. changing the load value of the fabric under the certain elongation into the load value per width of the fabric, and then we define this relative load as tightening force (resilience).

To further enhance the security efficiency of the vertical conveying channel, we also need to give full consideration to make its deformation in longitudinal direction, by the effect of the weight of the descent and the channel itself, be in a proper range. Preferably, the longitudinal elongation at break whereof is 2% to 45%, more preferably 2% to 35%, the most preferably 2% to 30%.

Though for person's soft body the vertical conveying channel usually does not been caused a fabric rupture when conveying people, it would be broken in the transmission of some angular objects, and its application is substantially affected. Therefore, the fabric needs to have a good toughness in some applications so that it cannot be broken easily.

According to the previously described, the vertical conveying channel is of a longitudinal breaking strength of 1500 N to 5000N, a latitudinal breaking strength of 800N to 4000N, preferably the longitudinal breaking strength of 1850 N to 4300N, the latitudinal breaking strength of 1000 N to 3700N, more preferably the longitudinal breaking strength of 2000 N to 4000N, the latitudinal breaking strength of 1300 N to 3500N.

For a further improvement of the safety capability of the channel, a lower plastic deformation rate of the fabric the channel made of is also needed. The latitudinal plastic deformation rate is of 5% to 25% according to the above vertical conveying channel, preferably of 5% to 20%, more preferably of 8% to 15%, the most preferably of 8% to 13%.

At present a variety of materials satisfies the requirement of the preparation of the fabric said above, for example, the warp yarn required for high tenacity and little elongation can be made of polyester, polyester cotton blended yarn, aramid fiber, high-strength polyethylene fibers, polypropylene fibers, etc. or natural fiber such as cotton, linen, wool, etc. or regenerated fiber such as viscose fiber, or blend fiber. The weft yarn such as polyester, polyester cotton blended yarn, aramid fiber, high-strength polyethylene fibers, polypropylene fibers, interweave or double with high elastic fiber such as spandex, or alone by high elastic fiber, and can be also made by interweaving or doubling of high elastic fiber such as spandex, PPT with natural fiber such as cotton, linen, wool, etc., regenerated fiber such as viscose fiber, blend fiber, or individually by the high elastic fiber such as spandex, PPT.

Generally, the person skilled in the art are familiar with the parameters of tenacity and elongation of varieties of fabric materials, i.e. according to their own knowledge or reading literatures related to this field, the person skilled in the art may get familiar with the parameters of various materials, and know whether the materials are applicable to manufacture the channel or not, and vice versa, according to taking an overall view of the present invention, the person skilled in the art could know the property parameters of the fabric the channel made of, combining with their own knowledge or public literatures in this field, then they can also know which materials are fit for making the channel.

In addition, the elastic composite fiber can be also made by the method of core-spun, China Pat. NO. 200580047970.6, for instance, discloses an elastic composite fiber made by the same method. Furthermore, some less elastic fibers can be also used to prepare the elastic composite fibers by adding in specific auxiliary reagent or other special processing methods. Polyamide fiber and PET fiber, for example, can be made into the elastic composite fibers. Moreover, by impregnating with polyurethane, some less elastic fibers can be changed into elastic composite fibers.

According to the previously described vertical conveying channel, the elastic fabric in the fiber contains spandex fibers of 10% to 50%, preferably 12% to 40%, more preferably 12% to 25%, the most preferably 15% to 20%.

It is preferable that the elastic composite fiber is composed of polyester fibers and polyamide fibers in addition, the polyester fibers wherein occupy 60% to 90% of the total weight of the elastic composite fiber, preferably 75%, to 88%; correspondingly, the polyamide fibers occupy 10%~40%, preferably 12% to 25%.

The elastic fabric may be made by weaving, knitting or braiding. The warp yarn of the woven fabric thereof is made of polyester fibers, and the weft yarn is made of polyester fibers and polyamide fibers by interweaving.

Meanwhile, in order to further increase the tenacity of the channel, some high-strength fibers may be added to the elastic fabric, such as high-strength polyethylene, aramid or other fibrous materials.

However, the elastic fabric of the vertical conveying channel can be prepared in accordance with any existing appropriate processing methods, it's preferred to use the following method: the elastic fabric is weaved as a latitudinal twofold structure textured in latitude direction, based on 3/1 cross-twill, or is weaved with twill weave, plain weave, or two-side weft-knitted with rib-knit.

Such specific methods as follows:

Woven fabrics: use 200D/48f polyester DTY filament and 140D/2f (70D/1f×2) spandex to coat in grid in the texturing process of polyester filament with draft multiple of 3.0-fold and interlacing degree (network density) of 100/m; then, the coated filament as the latitudinal material interlace with 200D/48f polyester DTY filament into 3/1 broken-twill. The trial samples turn to be smooth and of satisfied elasticity by scouring and drying for stereotype. It is therefore clear that the structure of the elastic fabric is weaved as a latitudinal twofold basing on 3/1 broken-twill with being textured in latitude direction, and can be also made of 150/48f polyester DTY filament and 210D spandex filament by coating in grid in the texturing process of polyester filament with the draft multiple of 3.5-fold and the interlacing degree (network density) of 100/m; then use the coated filament to be a raw material of weft, and interlace with 150D/48f polyester DTY filament into 3/1 broken-twill.; or utilize 75 polyester DTY filament and 420D spandex filament to coat in grid in the texturing process of polyester filament with the draft multiple of 3.5-fold and the interlacing degree (network density) of 100/m; then use the coated filament to be a raw material of weft, and interlace with 200D/48f polyester DTY filament into 3/1 broken-twill or other weaving types meeting requirement of the fabric said in the claims.

Knitted fabrics, as a double-sided weft knitting structure, may be rib-knitted, such as the following upper yarn position or other upper yarn position can be used:

Upper yarn position:

lines 1, 4, 7, 10 using 280D spandex lines 2, 5, 8, 11 using 200D Polyester Yarn lines 3, 6, 9, 12 using 32S cotton yarn.

According to the process of double faced jacquard circular machine, the preparation of the elastic fabric is illustrated in FIG. 3.

After select the proper materials for manufacturing the elastic fiber, the structure of the channel also need to be determined, such as the size of the diameter or the perimeter hereof. For example, when used in transporting personnel, the diameter of the fiber-based vertical conveying channel should be designed according to common body types. Generally, evaluated people get into the channel with their hands uplifted for descending conveniently, and people's height and somatotype are directly proportional to their weight. When a fatter people passes through the channel by gravity, the latitudinal deformation rate of the channel would be greater, so that a greater deformation restoring force will be induced because the diameter of the channel is defined, but a fatter body usually gains a greater gravity, thus the descending speed is still in control; Accordingly, for thinner body type, the thinner people passing through the channel would bear a minor elastic pressure for minor deformation rate of the channel, and with their smaller weight the descending speed can be in control, too.

Giving a sufficient consideration to human body, we will know that the key for the diameter and circumference of the channel is the size of hip circumference and the abdominal circumference of the body. However, the delivery of goods is relatively simple. Therefore, the channel can be designed like the shape of a cylinder, as shown in FIG. 1, and finally the channel could be made into a series of products.

Formula of the diameter size of the channel is expressed below:

Tightening force (resilience) being generated by the deformation of $\oint_2$ (circumference of the universal fiber-based vertical conveying channel) and $\oint_1$ (hip circumference or abdominal circumference of the body) control the descending speed of the body in a safe range. $\oint_2$ (circumference of the universal fiber-based vertical conveying channel) refer to the perimeter of the channel in the normal condition (not condition of deformation) of the fabric, $\oint_1$ refers to the circumference value denoted by L of the channel in a recoverable deformation, instead of the one in plastic deformation (the fabric structure is destroyed and the elastic deformation is non-recoverable) denoted by $L_1$.

Option for the value of L is very important. Generally, the smaller the difference between the value of L and $L_1$ is, the greater tightening force (resilience) is produced and the more excellent damping effect gains. But the life of the channel will be reduced. And even a stoppage for descending or a fabric broken would occur when a person with a special body type (especially fat) passes through the channel.

Accordingly, the greater the difference between the value of L and $L_1$ is, the longer the lifetime of the channel is. But the damping effect is decreased, something worse, the purpose for landing safety cannot be ensured.

Initial choice, a difference between the value of L and $L_1$ is denoted by h (its range should be between 15 cm to 30 cm), so $$\oint_1 = L_1 - h\text{(cm)}$$

$$L_1 = \oint_1 + h$$

According to the basic concepts of the weft elastic deformation rate of the fabric (denoted by $\Delta$L):

$$\Delta L = (L_1 - \oint_2)/\oint_2$$

$$\oint_2 = L_1/(1+\Delta L)$$

The diameter of the universal fiber-based vertical conveying channel:

$$\oint_2 = (\oint_1 + h)/(1+\Delta L)$$

According to the body shape classification by hip and chest circumference in national standards, the maximum value of $\oint_1$ in 100 cm to 110 cm is proper. In view of the rate of person with the hip, chest, or abdominal circumference overstepping the range 100 cm to 110 cm being less than 3.24%, as well as factors of the channel's lifetime and the damping effect, and so on, the value of h should be 10. And because of the minimal value of children's $\oint_1$ of 75 cm, in order to ensure a sufficient tightening force (resilience), there should be sufficient deformation for $\oint_2$ and $\oint_1$, and the value of $\oint_2$ should be 40 cm to 50 cm.

Then, the perimeter formulas of the channel are as follows:

$$\oint_2 = (\oint_1 + h)/(1+\Delta L)$$

$$\oint_2 = (110+10)/(1+\Delta L)$$

$$\oint_2 = 120/(1+\Delta L)$$

Taking the situation of children into account, $\oint_2$ value is of 40 cm to 50 cm, $\Delta$L=200%~140%.

Therefore, the perimeter of the channel is determined in the range of 10 cm to 120 cm.

When the channel is used for personnel transport, the perimeter is in the range 40 cm to 60 cm, preferably 40 cm to 50 cm, more preferably 45 cm.

Used for personnel transport, the channel can be used to be an escape apparatus for personnel stalemated in a high-rise building in a suddenly emergency for example. Its length can be determined basing on the building height, such as the height range may be 10 m to 500 m, preferably 10 m to 200 m, more preferably 10 m to 100 m, further more preferably 10 m to 50 m, the most preferably 20 m to 50 m. And it can be affixed on side of either inner or exterior of the building, or an area like a patio. When the building is too high, a fixture device would be preferably set on outsides of the channel to avoid the swing range of the channel being too large. The devices could be designed as a protective layer covering on the outer of the channel, or as a rope-like ribbon or a long strip fixing the channel spaced in the building.

When a person is descending through the channel, he can readily control the falling rate to ensure landing safety by extending or retracting limbs, as well as merely changing the body position.

When the perimeter of channel is 10 cm to 120 cm, it can be also used to deliver other objects, and can be designed into a series of products.

In order to further facilitate the persons or goods to get into the channels, the perimeter of the upper end of the channel should be set larger than the diameters of descent objects.

According to the vertical conveying channel, some anti-bacterial and/or flame-retardant fiber is added in the fabric.

The flame-retardant fabric can be made of some fiber coated with some special materials or added by some auxiliary reagent, so that the fabric has a property of flame retardancy.

For example, the fabric can be coated with inorganic or organic flame retardants. The inorganic flame-retardants mainly contain antimony compounds, inorganic boron compounds, inorganic phosphorus flame retardants, inorganic hydroxides, etc. and the organic flame retardants include organic halogenated flame retardants and organic phosphorus flame retardants.

Antimony flame retardants taken into use commonly include Patox made by Japan's Seiko Co., Ltd., superfine high-purity active antimony oxide produced by Guizhou Rongjiang Fenghua antimony compounds chemical industry, NyacoIADP480 developed by PolycomHuntsman Company, etc. Besides, a composite flame retardant manufactured by antimony trioxide remixing with aluminum hydroxide, zinc borate, fluoroborate or other compounds has the advantages that can not only reduce the dosage of antimony trioxide but also decrease the amount of smoke obviously.

Brominated flame retardants contain PB-68 with the main ingredient of brominated polystyrene made by Ferro Corporation, poly five-bromophenol acrylate developed respectively by the two companies: Belfast and Ameribrom.

Most of the phosphorus flame retardants are liquid, such as halogenated phosphate ester, Firemacster836 made by Great-Lake company, the domestic production of dicumyl phosphate, etc.

The aluminum hydroxide flame retardants include new varieties of Micrai 10000 and Micrai 1500 developed by the United States SOLEM company, and the Hydrax series of aluminum hydroxide manufactured by the U.S. Climax company.

In addition, there are some new varieties improving the surfaces, such as the kind of aluminum hydroxide treated by the new silane process and coated with organic silicone; some new varieties of inorganic synergists is added, such as metal oxide and zinc borate, phosphorus compounds (red phosphorus, phosphate), silicon compounds, metal nitrates (nitrate, copper, silver nitrate), poly ammonium phosphate, etc., some new varieties of magnesium hydroxide, some intumescent flame retardants such as NH-1197 and NH-1151 made by Great Lake, etc.

Nitrogen-phosphorus water-soluble flame retardants are widely used in flame checking of polyester, polyester blend and other synthetic fabrics. The flame retardants heated can produce flame retardant gas or non-combustible solid coverings, so that make the fabric non-inflammable. The flame retardant is made by inorganic compound (70%) remixing with organic compound (30%), the total effective content is of 35%. And the appearance as: colorless transparent liquid, pH7±0 5, soluble in cold or warm water readily, the flame-retardant properties of the fabrics being added by proper amount of the flame retardants can be up to vertical burning B1-level indicators by using the GB50222-95 standard method to determine.

When a fabric is rolled with a flame retardants solution concentration of 600 g/L, the liquid pickup rate of the fabric is 70%, then dried at 100° C., finally, per square meter of the fabric contains the flame retardants 80 g to 120 g, and the role of fire retardant can be achieved.

This vertical conveying channel, especially used in the fire rescue, can prevent the fabric from burning, as well as be more security in use.

In addition, the fabric can even be added anti-bacterial coating in order to achieve the antibacterial effect, for example, a natural antibacterial agent such as chitosan or plant extracts; or organic antibacterial agent such as isothiazolin-ketone, formaldehyde releasing agents, organic amine and so on; or inorganic antibacterial agent containing mercury, silver, copper, chromium, or zinc ion. The person skilled in the art usually knows these antimicrobial agents and coating methods, and no longer need to pay the creative work. For example, the article "Antimicrobial Coatings New Development", reported in *Materials Science*, volume 22, No. 3, the March, 2008, discloses a variety of antimicrobial coatings.

The vertical conveying channel related in the present invention can even be coated with camouflage patterns used for military purposes for playing a very good effect on hiding and protecting. In accordance with topography, geomorphology, or other environmental factors, the camouflage patterns coated on the channel can refer to any public available camouflage.

The vertical conveying channel in the present invention can also be coated with any other color on the outer layer or created any patterns for a distinction, eye-catching, etc. For example, the channel can be painted different colors to be distinguished readily according to different purposes and different application environments. Besides, the channel can be painted with eye-striking colors so as to prompt people using it in an emergency.

The color coating on the channel can be produced by any method of the existing technology. For example, it can be coated up, and can be also dyed on the fabric directly.

According to the previously described, the vertical conveying channel can be used for vertically transporting, goods or persons, preferably used in fields of life-saving, engineering or the military.

Excellences of the technical scheme of the present invention are as follows:

(1) The vertical conveying channel in the present invention, being made of high-elastic fabric, has an excellent elastic recovery rate, and can give an effective buffer on the descending body. So its safety capability is high.

(2) The vertical conveying channel in the present invention is simple in structure, easy to operate, and regardless of age, physical limitations. In case of an emergency, any person can use the channel reliably.

(3) The vertical conveying channel in the present invention meets the needs of vertical transportation in a variety of fields without limitation of the surrounding environment such as topography and geomorphology.

EMBODIMENTS OF THE INVENTION

Figure 1:
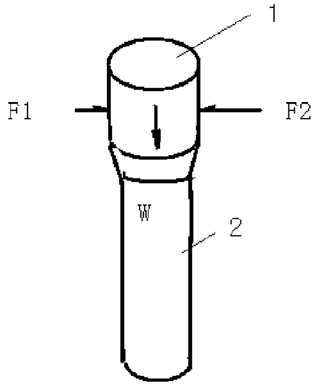
FIG. 1 shows schematically a side view of one preferred embodiment of the present invention. Referring to this drawing, 1 refers to the entrance of the channel, 2 refers to the passage of the channel. F1, $F_2$ shows resilience of the fabric, and W denotes the gravity of the descent.
Figure 2:
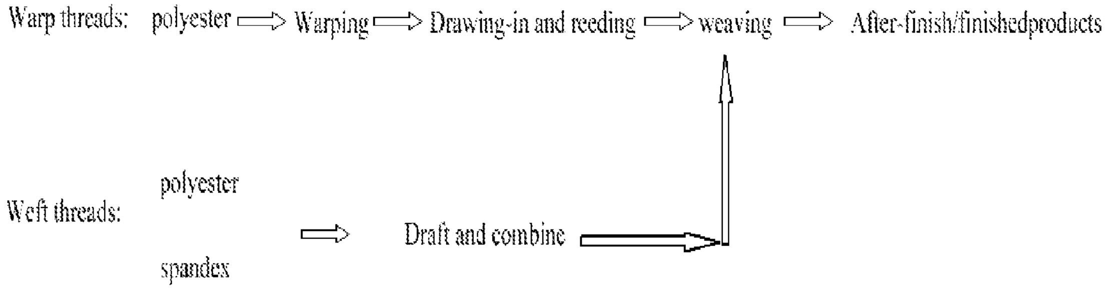
FIG. 2 shows the preferred process of the elastic fabric referred in the present invention.

The following embodiments will be used to explain the present invention more specifically. But the present invention is not limited to these embodiments as well as these embodiments are not limited to the present invention in any way.

Embodiment 1

Experiment table height is 22 m, the elastic fabric of which the channel made is composed of polyester 85% and spandex 15%, the warp threads thereof is made of 100% polyester and the weft made of 200D/48f polyester DTY filament coating with 140 D/2f (70D/1f×2) spandex filament in grid.

The fabric has a latitudinal elastic deformation rate of 170%, a latitudinal resilience of 750N, a latitudinal elastic recovery rate of 85%, a longitudinal breaking elongation of 20%, a longitudinal breaking strength of 3000N, a latitudinal breaking strength of 2000N, a latitudinal plastic deformation rate of 10%. The structure of the fabric said above is as follows: the warp threads thereof is made of 200D/DTY polyester filaments and the weft is made of 200D/48f polyester DTY filament coating with 140D/2f (70D/1f×2) spandex filament in grid;

Warp-weft density: 43.2/cm, 66/cm;

Breadth: 70 cm;

Grammage: 740 g/m$^2$;

Circumference of the channel: 45 cm;

Three body-types:

1. waistline: 73.3 cm; weight 55 kg;
2. waistline: 76.7 cm; weight 65 kg;
3. waistline: 80.0 cm; weight 75 kg.

The results: the time for the descents landing from 22 m height is in 4 s to 17 s, which can meet the requirement of landing safety.

Embodiment 2

Experiment table height is 32 m, the elastic fabric of which the channel made is composed of polyester 84% and spandex 16%, the warp threads thereof is made of 100% polyester and the weft made of 200D/48f polyester DTY filament coating with 140 D/2f (70D/1f×2) spandex filament in grid.

The fabric has a latitudinal elastic deformation rate of 300%, a latitudinal resilience of 2000N, a latitudinal elastic recovery rate of 94%, a longitudinal breaking elongation of 30%, a longitudinal breaking strength of 4000N, a latitudinal breaking strength of 3500N, a latitudinal plastic deformation rate of 8%.

The structure of the fabric said above is as follows: the warp threads thereof is made of 200D/48f polyester DTY filaments and the weft is made of 200D/48f Polyester DTY filament coating with 140 D/2f (70D/1f×2) spandex filament in grid;

Warp-weft density: 54/cm×65/cm;

Breadth: 65 cm;

Grammage: 760 g/m$^2$;

Circumference of the channel: 45 cm;

Three body-types:

1. waistline: 73.3 cm; weight 55 kg;
2. waistline: 76.7 cm; weight 65 kg;
3. waistline: 80.0 cm; weight 75 kg.

The results: the time for the descents landing from 32 m height is in 10 s to 25 s, which can meet the requirement of landing safety sufficiently.

Embodiment 3

Experiment table height is 22 m, the elastic fabric of which the channel made is composed of polyester 85% and spandex 15%, the warp threads thereof is made of 100% polyester and the weft made of 200D/48f polyester DTY filament coating with 140 D/2f (70D/1f×2) spandex filament in grid.

The fabric has a latitudinal elastic deformation rate of 140%, a latitudinal resilience of 550N, a latitudinal elastic recovery rate of 80%, a longitudinal breaking elongation of 12%, a longitudinal breaking strength of 1900N, a latitudinal breaking strength of 1000N, a latitudinal plastic deformation rate of 13%.

The structure of the fabric said above is as follows: the warp threads thereof is made of 200DDTY polyester filaments and the weft is made of 200D/48f polyester DTY filament coating with 140 D/2f (70D/1f×2) spandex filament in grid;

Warp-weft density: warp 43.2/cm, weft 66/cm;

Breadth: 70 cm;

Grammage: 740 g/m$^2$;

Circumference of the channel: 45 cm;

Three body-types:

1. waistline: 56.7 cm; weight 40 kg;
2. waistline: 60.0 cm; weight 45 kg;
3. waistline: 63.3 cm; weight 50 kg.

The results: the falling time of the descents landing from 22 m height is 8 s to 22 s, which can meet the requirement of landing safety sufficiently.

Embodiment 4

Experiment table height is 50 m, the elastic fabric of which the channel made is composed of polyester 83% and spandex 17%, the warp threads thereof is made of 100% polyester and the weft made of 200D/48f polyester DTY filament coating with 140 D/2f (70D/1f×2) spandex filament in grid.

The fabric has a latitudinal elastic deformation rate of 350%, a latitudinal resilience of 2000N, a latitudinal elastic recovery rate of 95%, a longitudinal breaking elongation of 35%, a longitudinal breaking strength of 4300N, a latitudinal breaking strength of 3500N, a latitudinal plastic deformation rate of 10%.

The structure of the fabric said above is as follows: the warp threads thereof is made of 200D/DTY polyester filaments and the weft is made of 200D/48f polyester DTY filament coating with 140 D/2f (70D/1f×2) spandex filament in grid;

Warp-weft density: warp 43.2/cm, weft 66/cm;

Circumference of the channel: 50 cm;

Three body-types:

1. waistline: 73.3 cm; weight 55 kg;
2. waistline: 76.7 cm; weight 65 kg;
3. waistline: 80.0 cm; weight 75 kg.

The results: the time for the descents landing from 50 m height is in 15 s to 30 s, which can meet the requirement of landing safety sufficiently.

Embodiment 5

Experiment table height is 40 m, the elastic fabric of which the channel made is composed of polyester 79% and spandex 21%, the warp threads thereof is made of 100% polyester and the weft made of 100D/48f polyester DTY filament coating with 420 D spandex filament in grid.

The fabric has a latitudinal elastic deformation rate of 150%, a latitudinal resilience of 350N, a latitudinal elastic recovery rate of 75%, a longitudinal breaking elongation of 45%, a longitudinal breaking strength of 5000N, a latitudinal breaking strength of 4000N, a latitudinal plastic deformation rate of 10%.

The structure of the fabric said above is as follows: the warp threads thereof is made of 200DDTY polyester filaments and the weft is made of 100D/48f polyester DTY filament coating with 420 spandex filament in grid;

Warp-weft density: 42/cm, 38/cm;

Circumference of the channel: 120 cm;

Two types of descents:

1. cylinder, circumference 180 cm; weight 100 kg;
2. cylinder, circumference 180 cm; weight 120 kg.

The results: the time for the descents landing from 40 m height is 14 s to 25 s, which can meet the requirement of landing safety sufficiently.

Embodiment 6

Experiment table height is 22 m, the elastic fabric of which the channel made is composed of polyester 50% and spandex 50%, the warp threads thereof is made of 100% polyester and the weft made of 100D/48f polyester DTY filament coating with 420 D spandex filament in grid.

The fabric has a latitudinal elastic deformation rate of 450%, a latitudinal resilience of 2500N, a latitudinal elastic recovery rate of 100%, a longitudinal breaking elongation of 2%, a longitudinal breaking strength of 1500N, a latitudinal breaking strength of 800N, a latitudinal plastic deformation rate of 5%.

The structure of the fabric said above is as follows: the warp threads thereof is made of 200D/DTY polyester filaments and the weft is made of 100D/48f polyester DTY filament coating with 420 D spandex filament in grid;

Warp-weft density: 42/cm, 38/cm;

Circumference of the channel: 80 cm;

Two types of descents:

1. cylinder, circumference 180 cm; weight 220 kg;
2. cylinder, circumference 180 cm; weight 250 kg.

The results: the time for the descents landing from 22 m height is 6 s to 19 s, which can meet the requirement of landing safety sufficiently.

Embodiment 7

Experiment table height is 22 m, the elastic fabric of which the channel made is composed of polyester 70%, high-strength polyethylene fibers 15% and spandex 15%, the warp threads thereof is made of 85% polyester and 15% high strength polyethylene fiber, the weft is made of 200D/48f polyester DTY filament coating with 140 D/2f (70D/1f×2) spandex filament in grid.

The fabric has a latitudinal elastic deformation rate of 250%, a latitudinal resilience of 2000N, a latitudinal elastic recovery rate of 80%, a longitudinal breaking elongation of 20%, a longitudinal breaking strength of 4500N, a latitudinal breaking strength of 2000N, a latitudinal plastic deformation rate of 15%.

The structure of the fabric said above is as follows: the warp threads thereof is made of 200D/DTY polyester filaments and the weft is made of 200D/48f polyester DTY filament coating with 140 D/2f (70D/1f×2) spandex filament in grid;

Warp-weft density: 43.2/cm, 66/cm;

Breadth: 70 cm;

Grammage: 740 $g/m^2$;

Circumference of the channel: 40 cm;

Three body-types:

1. waistline: 80.0 cm; weight 80 kg;
2. waistline: 83.3 cm; weight 90 kg;
3. waistline: 86.7 cm; weight 100 kg.

The results: the time for the descents landing from 22 m height is in 15 s to 32 s, which can meet the requirement of landing safety.

Embodiment 8

Experiment table height is 15 m, the elastic fabric of which the channel made is composed of polyester 60% and spandex 40%, the warp threads thereof is made of 100% polyester and the weft made of one third of polyester and two thirds of spandex.

The fabric has a latitudinal elastic deformation rate of 400%, a latitudinal resilience of 1500N, a latitudinal elastic recovery rate of 90%, a longitudinal breaking elongation of 35%, a longitudinal breaking strength of 3500N, a latitudinal breaking strength of 3500N, a latitudinal plastic deformation rate of 10%.

Knitted fabrics, as a double-sided weft knitting structure, may be rib-knitted, such as the following or other upper yarn position:

Upper yarn position:

line 1, 4, 7, 10 using 280D spandex;

line 2, 5, 8, 11 using 200D polyester yarn;

line 3, 6, 9, 12 using 200 polyester yarn.

Two types of descents:

1. cylinder, circumference 110 cm; weight 45 kg;
2. cylinder, circumference 110 cm; weight 55 kg.

The results: the time for the descents landing from 15 m height is 5 s to 10 s, which can meet the requirement of landing safety sufficiently.

Embodiment 9

Experiment table height is 100 m, the elastic fabric of which the channel made is composed of high-strength polyethylene fibers 50%, spandex 20% and cotton 30%, the warp threads thereof is made of high-strength polyethylene fibers and cotton with the proportion being 4 to 1 and the weft is made of high-strength polyethylene fibers, spandex and cotton with the proportion being 1/2/2.

The fabric has a latitudinal elastic deformation rate of 150%, a latitudinal resilience of 500N, a latitudinal elastic recovery rate of 75%, a longitudinal breaking elongation of 25%, a longitudinal breaking strength of 3000N, a latitudinal breaking strength of 3000N, a latitudinal plastic deformation rate of 15%.

Processing methods can refer to existing technologies, such as the patent application No. 03112736.3.

The surface of the channel is coated with nano-silver as an anti-bacterial material, the coating material is colorless transparent liquid, silver silicon complexes: Min 25%, pH (2% working solution) 7.5±0.5, with ionicity of weak cation, grain size (silver) of 2 nm and density of 1.06±0.1 g/ml.

Circumference of the channel: 60 cm;

Three body-types:

1. waistline: 73.3 cm; weight 55 kg;
2. waistline: 76.7 cm; weight 65 kg;
3. waistline: 80.0 cm; weight 75 kg.

The results: the time for the descents landing from 100 m height is in 80 s to 150 s, which can meet the requirement of landing safety.

Embodiment 10

Experiment table height is 200 m, the elastic fabric of which the channel made is composed of high-strength polyethylene fibers 80%, spandex 20%, the warp threads thereof is made of high-strength polyethylene fibers 100%, and the weft is made of high-strength polyethylene fibers and spandex with the proportion being 1.5 to 1.

The fabric has a latitudinal elastic deformation rate 400%, a latitudinal resilience of 2000N, a latitudinal elastic recovery rate of 90%, a longitudinal breaking elongation of 5%, a longitudinal breaking strength of 3000N, a latitudinal breaking strength of 3500N, a latitudinal plastic deformation rate of 18%.

The surface of the channel is coated with nitrogen-phosphorus water-soluble flame retardants (Phosphorus content of more than 15%-25%, nitrogen content of 37%-48%, pH (10% solution) 6-7, water content of less than 0.2%, decomposition temperature of higher than 285° C., fineness specification of 10 mm more than 97%, solubility (25° C., g/100 ml $H_2O$) of less than 0.25, viscosity (25° C., 10% aqueous solution) of less than 60 mPa·s). The fabric was rolled with a flame retardants solution with concentration of 600 g/L, with liquid pickup rate of 70%, after drying at 100° C., per square meter of the fabric contains the flame retardants 100 g.

Circumference of the channel: 60 cm;

Three body-types:

1. waistline: 73.3 cm; weight 55 kg;
2. waistline: 76.7 cm; weight 65 kg;
3. waistline: 80.0 cm; weight 75 kg.

The results: the time for the descents landing from 100 m height is in 80 s to 150 s, which can meet the requirement of landing safety.

Embodiment No. 11-15

| | Embodiment Number | | | | |
|---|---|---|---|---|---|
| | 11 | 12 | 13 | 14 | 15 |
| contents | polypropylene 50% viscose fiber 27% spandex 23% | Polyamide 50% linen 30% spandex 20% | high-strength polyethylene 30% wool polyester 42% spandex 28% | polyester cotton 80% spandex 20% | Polyester 50% Spandex 30% Aramid 20% |
| warp threads | Polypropylene 80% viscose fiber 20% | polyamide:linen 1:1 | high-strength polyethylene:wool polyester 2:1 | polyester cotton 100% | polyester:polyamide 4:1 |
| weft threads | polypropylene:viscose fiber:spandex 1:1:1 | polyamide:spandex 3:2 | wool polyester:spandex 2:1 | polyester cotton:spandex 3:2 | polyester:spandex:aramid 1:3:1 |
| latitudinal elastic deformation rate | 350% | 400% | 420% | 330% | 240% |
| latitudinal resilience | 1500 N | 2000 N | 1800 N | 2300 N | 2500 N |
| latitudinal elastic recovery rate | 75% | 70% | 80% | 95% | 85% |
| longitudinal breaking elongation | 8% | 42% | 40% | 45% | 25% |
| longitudinal breaking strength | 4500 N | 1700 N | 3500 N | 4500 N | 2000 N |
| latitudinal breaking strength | 3200 N | 1500 N | 6500 N | 3000 N | 2500 N |
| latitudinal plastic deformation rate | 5% | 12% | 10% | 20% | 25% |

Embodiment 16

Material specifications: the warp is made of 200D/48f polyester DTY; the weft is made of 200D/48f PET DTY coating with 140D spandex in grid, with the draft multiple 3.5 times, and the network density of 100/m.

The machine weaving conditions: the warp density of 16/cm (5120/320 cm) and the weft density of 50/cm.

Production process:

Warp threads: $200D/48f$ polyester $DTY$ filaments → Warping → Drawing in
Weft threads: $200D/48f$ polyester $DTY$ filaments, $140D/2f(70D/1f \times D)$ spandex filaments — Coated in grid
weaving → scouring → setting → Finished product Product Specifications: sample width: 70 cm, warp-weft density 43/cm×66/cm, gramweight per square meter: 740 g/m$^2$, spandex content: 16.5%.

Embodiment 17

The knitted fabric is woven as the pattern with two-side weft-knit and rib-knit, using the upper yard position as follows or other upper yard position.

Upper yarn position:

line 1, 4, 7, 10 using 280D spandex;

line 2, 5, 8, 11 using 200D polyester yarn;

line 3, 6, 9, 12 using 200 polyester yarn.

Polyester content: 75%; spandex content: 25%.

Figure 3:
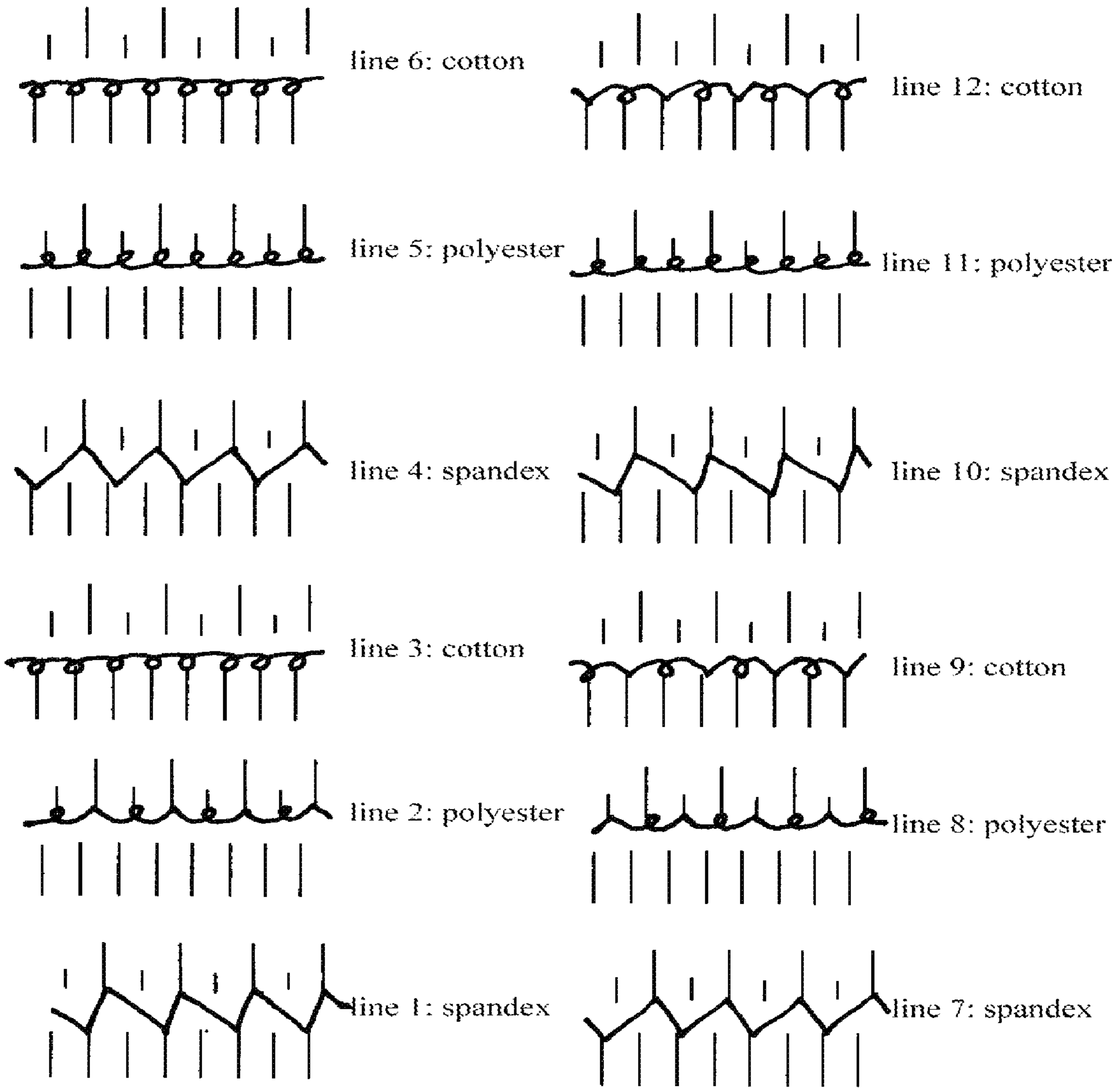
FIG. 3 shows schematically the weave methods.

In accordance with the process of Double Faced Stretch Jacquard Circular machine, knitting figure of the products in rib is shown in FIG. 3. Such as the breadth of the grey fabric after removed from looms is 52 cm by using the 30-inch barrel diameter device.

What is claimed is:

1. A vertical conveying channel, comprising:

an inner surface and outer surface, an inner space that longitudinally extends with at least one end opened, the inner surface of the channel is elastic, and an inner diameter of the channel is less than a diameter of an object to be transported along the channel, and the object to be transported along the channel is pressed by contracting of the inner surface of the channel during use, to slow down a falling speed of the object;

wherein, the inner surface of the channel is made of elastic fabric, the elastic fabric has a latitudinal elastic deformation rate of 100% to 450%, a latitudinal resilience of 300N to 2500N on condition of latitudinal elongation at break of 80%, a latitudinal elastic recovery rate of 70% to 100%, a latitudinal breaking strength of 800N to 4000N, and a latitudinal plastic deformation rate of 5% to 25%; and the elastic fabric has a longitudinal elongation at break of 2% to 45%, the elastic fabric has a longitudinal breaking strength of 1500N to 5000N, wherein, the elastic fabric is weaved as a latitudinal two-fold structure textured in the latitudinal direction, based on 3/1 cross-twill, or is weaved with twill weave, plain weave, or is knitted as a two-side weft-knitted structure with rib-knit.

2. The vertical conveying channel according to claim 1, wherein, the elastic fabric contains spandex fiber of 10% to 50%.

3. The vertical conveying channel according to claim 2, wherein the elastic fabric contains spandex fiber of 12% to 40%.

4. The vertical conveying channel according to claim 1, wherein the elastic fabric is filled in antibacterial fiber or flame-retardant fiber.

5. The vertical conveying channel according to claim 1, wherein, the exterior of the channel is coated with color or camouflage pattern.

6. The vertical conveying channel according to claim 1, wherein the latitudinal elastic deformation rate is 120% to 400%, the latitudinal resilience is 350 N to 2300 N, and the latitudinal elastic recovery rate is 75% to 98%.

7. The vertical conveying channel according to claim 6, wherein the latitudinal elastic deformation rate is 140% to 350%, the latitudinal resilience is 550N to 2200N, and the latitudinal elastic recovery rate is 80% to 96%.

8. The vertical conveying channel according to claim 7, wherein the latitudinal elastic deformation rate is 170% to 300%, the latitudinal resilience is 750N to 2000N, and the latitudinal elastic recovery rate is 85% to 94%.

9. The vertical conveying channel according to claim 1, wherein the longitudinal breaking strength is 1850N~4300N, and the latitudinal breaking strength is 1000N to 3700N.

10. The vertical conveying channel according to claim 9, wherein the longitudinal breaking strength is 2000N to 4000N, and the latitudinal breaking strength is 1300N to 3500N.

11. The vertical conveying channel according to claim 1, wherein the latitudinal plastic deformation rate is 5% to 20%.

12. The vertical conveying channel according to claim 11, wherein the latitudinal plastic deformation rate is 8% to 13%.

13. The vertical conveying channel according to claim 3, wherein the elastic fabric contains spandex fiber of 12% to 25%.

14. The vertical conveying channel according to claim 13, wherein the elastic fabric contains spandex fiber of 15% to 20%.

* * * * *